(12) United States Patent
Bellet et al.

(10) Patent No.: US 11,308,430 B2
(45) Date of Patent: Apr. 19, 2022

(54) KEEPING TRACK OF IMPORTANT TASKS

(71) Applicant: MICROSOFT TECHNOLOGY LICENSING, LLC, Redmond, WA (US)

(72) Inventors: Vincent Bellet, Kirkland, WA (US); Paul Sim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 16/600,423

(22) Filed: Oct. 11, 2019

(65) Prior Publication Data
US 2021/0110327 A1    Apr. 15, 2021

(51) Int. Cl.
*G06Q 10/06* (2012.01)
*G06Q 10/10* (2012.01)

(52) U.S. Cl.
CPC .......... *G06Q 10/06316* (2013.01); *G06Q 10/063114* (2013.01); *G06Q 10/1095* (2013.01)

(58) Field of Classification Search
None
See application file for complete search history.

(56) References Cited

U.S. PATENT DOCUMENTS

| | | | |
|---|---|---|---|
| 10,257,149 B2 | 4/2019 | Abou Mahmoud et al. | |
| 2010/0004977 A1* | 1/2010 | Marci | G06Q 30/0203 |
| | | | 705/7.32 |
| 2012/0054132 A1 | 3/2012 | Aberdeen et al. | |
| 2012/0143733 A1* | 6/2012 | Kappauf | G06Q 30/04 |
| | | | 705/32 |
| 2015/0039704 A1 | 2/2015 | Kursun | |
| 2015/0074202 A1 | 3/2015 | Vanblon et al. | |
| 2015/0200906 A1 | 7/2015 | Ganesh | |
| 2016/0344673 A1* | 11/2016 | Abou Mahmoud | H04L 67/306 |
| 2017/0195381 A1 | 7/2017 | Michael et al. | |
| 2019/0140993 A1 | 5/2019 | Deets et al. | |
| 2019/0222892 A1* | 7/2019 | Faulkner | H04N 21/4314 |

OTHER PUBLICATIONS

"The Definitive Guide to Using Samepage", Retrieved from: https://www.samepage.io/cs/uzivatelska-prirucka, Retrieved Date: Jul. 29, 2019, 43 Pages.

Bennett, et al., "Detecting Action-Items in E-mail", In Proceedings of 28th annual international ACM SIGIR conference on Research and development in information retrieval, Aug. 15, 2005, 2 Pages.

(Continued)

*Primary Examiner* — Romain Jeanty
(74) *Attorney, Agent, or Firm* — NovoTechIP International PLLC

(57) ABSTRACT

A data processing system including a processor and machine-readable media including instructions for the processor. When executed by the processor, the instructions cause the processor to monitor events in a plurality of communications channels associated with a user, identify monitored events that are determined to be pertinent to the user, sort the identified events by priority to create a prioritized list of events, monitor interactions with the data processing system by the user for a task initiation signal, and, in response to detecting the task initiation signal, cause display of the prioritized list of events to the user on a display device.

20 Claims, 7 Drawing Sheets

(56) References Cited

OTHER PUBLICATIONS

Kapko, Matt, "Cortana explained: How to use Microsoft's virtual assistant for business", Retrieved from: https://www.computerworld.com/article/3252218/cortana-explained-why-microsofts-virtual-assistant-is-wired-for-business.html, Feb. 7, 2018, 16 Pages.
Pleasant, Blair, "The future of meetings—using AI to improve team collaboration", Retrieved from: https://www.microsoft.com/en-us/microsoft-365/growth-center/resources/the-future-of-meetings-using-ai-to-improve-team-collaboration, Apr. 1, 2019, 4 Pages.
Scerri, et al., "Semanta—Semantic Email in Action", In European Semantic Web Conference, May 31, 2009, pp. 883-887.
"International Search Report and Written Opinion Issued in PCT Application No. PCT/US20/049615", dated Nov. 4, 2020, 11 Pages.

\* cited by examiner

Here are some activities you missed while you were gone

Most active coversations while away:

- Krystal Mckinney — 11:09 PM
  Needs your eyes on this as soon as you get back – need your feedback  !
- July Promo Planning — 10:39 PM
  These are amazing numbers and case studies - can't wait to see how this...
- @Jazmin mentioned you — 9:37 PM
  Marketing > Northwind Traders
  I haven't checked the latest July promo deck but the comps that Keiki sent...

See more

Next meeting:

- Pre-release plan
  10:00 AM – 10:30 AM

Recorded meetings:

- Product Meeting — 9/28
  Recorded by: Jazmine Simmons
- Review Meeting — 9/25
  Recorded by: Laurence Gibson Most active file while away:

- July promo deck — last opened 1 hr ago

Fig. 1

Keiki Tanaka

Today's catch up

- July promotions
  Main conference room, 1PM-2PM

- JulyPromotion.docx
    See more

- Update presentation with June numbers
    Check on status of slides

- Krystal Mckinney +2 others
    Northwind Traders -> Marketing          2 hr ago
    These numbers look solid, but I'm wondering about...

People who are talking about July promotions

- Market Watch 19.pptx

- Babak Shamash
    These are some really nice charts! Easy to understand.

- Market 19
    Data for August projections

- Market evaluation to-do
    Who has time to update the market projections?

People who are talking about Market Watch 19

Fig. 4

KEEPING TRACK OF IMPORTANT TASKS

TECHNICAL FIELD

The present application relates generally to tools and methods for managing workflow, and specifically to tools for providing users with directions for starting a new task.

BACKGROUND

As computers have grown ever more powerful and more interconnected, new ways of working together have arisen. There are a number of integrated work-sharing platforms (such as MICROSOFT® TEAMS and SLACK®) where users can communicate by text, communicate by audio and/or video, share documents, and edit them together in real time. These tools provide new power to users, but they may also result in a technical problem of providing too much information for a single person to absorb, with multiple data flows leading to frustration and overload. Hence, there is a need for automated tools that can prioritize tasks and reassure users that they are not missing important messages or other events.

SUMMARY

In one aspect, a data processing system includes a processor and machine-readable media including instructions. When executed by the processor, the instructions cause the processor to monitor events in a plurality of communications channels associated with a user, each communications channel representing an avenue of communication between the user and one or more communication partners, identify monitored events that are determined to be pertinent to the user, sort the identified events by priority to create a prioritized list of events, monitor interactions with the data processing system by the user for a task initiation signal, wherein the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user, and in response to detecting the task initiation signal, cause display of the prioritized list of events to the user on a display device.

In another aspect, a method performed by a data processing system for selectively displaying events pertinent to a user includes monitoring a plurality of communications channels associated with the user, each communications channel representing an avenue of communication between the user and one or more communication partners, identifying events that are determined to be pertinent to the user, sorting the identified events by priority to create a prioritized list of events, monitoring interactions with the data processing system by the user for a task initiation signal, wherein the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user, and, in response to detecting the task initiation signal, cause display of the prioritized list of events to the user on a display device.

In another aspect, a data processing system includes a plurality of communications channels, each communications channel representing an avenue of communication between a user and one or more communication partners, a memory configured to collect and to store events from the communications channels, a prioritizer configured to receive a record of events from the memory and further configured to create a prioritized list of events that are expected to be most relevant to the user, a task monitor configured to determine that the user is ready to begin a new task, wherein the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user, and a user interface configured to present the prioritized list of events in response to a determination by the task monitor that the user is ready to begin the new task.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 is an example user interface for notifications in a work collaboration space.

FIG. 4 is another implementation of a user interface.

DETAILED DESCRIPTION

Figure 2:
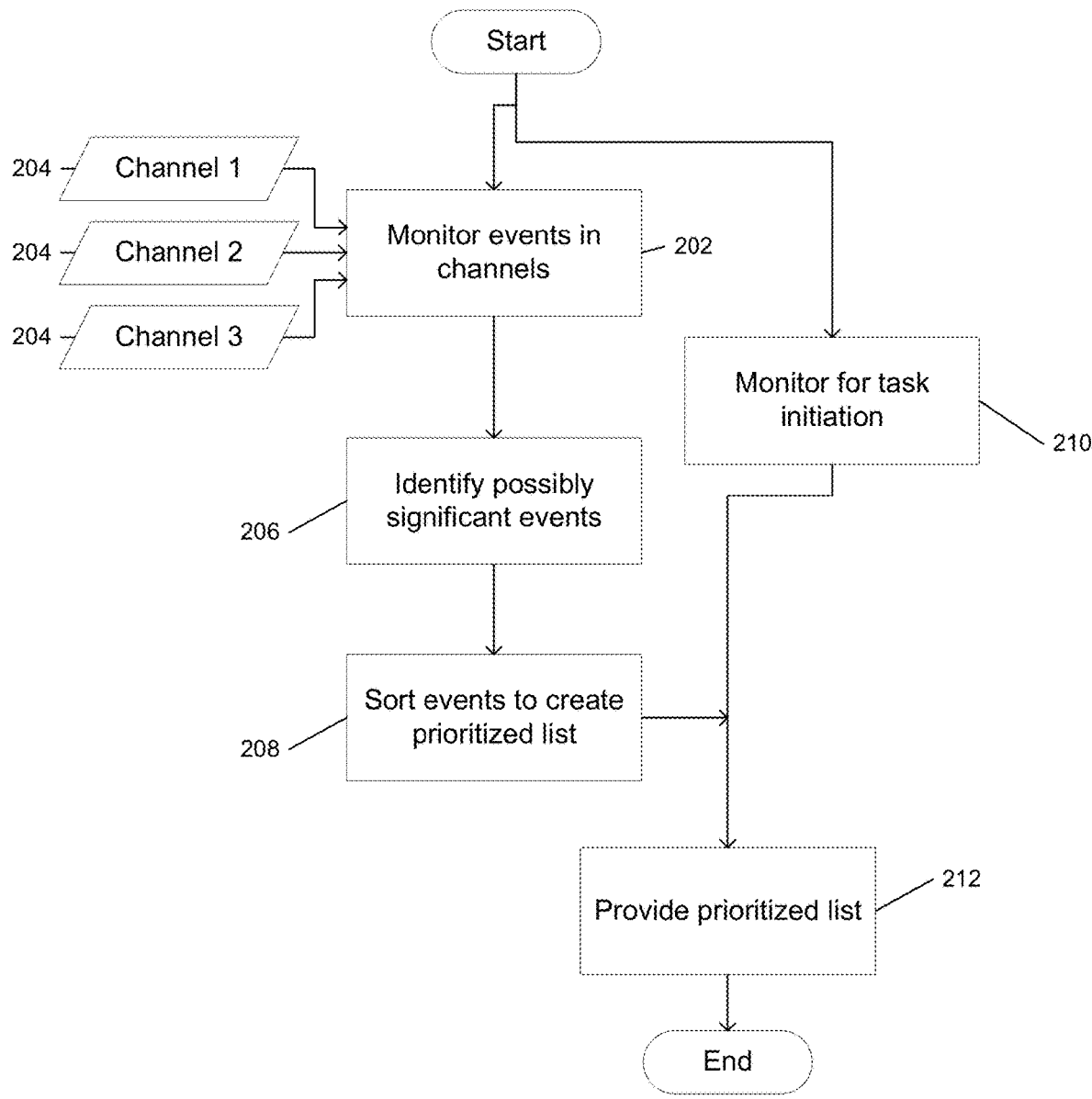
FIG. 2 is a flow chart describing the process by which a system may generate user notifications.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Integrated work collaboration spaces (such as MICROSOFT TEAMS®) provide powerful tools for working together in an enterprise. However, a proliferation of such tools has led not only to productivity but also to anxiety and stress, as workers need to manage technical problems of keeping track of documents and discussions in many locations that may be modified by many other people. The following systems and methods are designed to provide the technical benefit of locating tasks and other work issues across different areas of such an environment and presenting them to the user at the right time in his or her workflow, alleviating anxiety and enhancing productivity.

For simplicity and understanding, the systems and methods described below have largely been described in the context of a single work collaboration space, but in some implementations, multiple channels associated with different spaces may be monitored. For example, a user may see SLACK® @-mentions, GOGGLE® documents, TRELLO® task assignments, OUTLOOK® emails, and ZOOM® meeting recordings all in the same window. The system may monitor any subset of these different environments to collect a prioritized list of possible work areas that may be presented to the user just as he is ready to turn to a new task. The present systems and methods may be configured to work with different available services, providing the technical benefit of collecting events occurring in spaces that otherwise do not "know" each other or monitor notifications from one another. This functionality produces the technical effect of allowing users to use whichever tools they prefer, without having to monitor many different channels to be sure they are not missing important information. The systems and methods described herein may be implemented in software, hardware, or a combination of both, and may include display on a variety of devices, including but not limited to a desktop computer, a laptop computer, a mobile device such as a phone or tablet, a terminal, or a wearable device such as a smart watch. The details of such display may be tailored to the device, for example by showing fewer events on a wearable device than on a desktop computer.

FIG. 1 shows generally one implementation of a graphical user interface (GUI) for a work collaboration space, providing a summary of recent activities. As used herein, a "work collaboration space" is an application, suite of applications, or cloud-based service that provides a working space where users may share and discuss work with one another. Often, but not always, such a platform will include areas for storing files and dedicated "chat" areas where people may discuss work topics. It might also include primarily asynchronous messaging capability such as email, and/or support for synchronous communication such as audio and/or video communication. In the latter case, the work collaboration space may also include tools for saving the contents of such communication, for example as audio/video records and/or as text (for example, by using speech-to-text software to create a meeting transcript). Examples of work collaboration spaces include MICROSOFT TEAMS® or SLACK®. These are non-limiting examples, and any other electronic content editing or collaboration application may benefit from the disclosed implementations. Specific references to a software application by name or by graphical interface elements throughout this description should not therefore be understood to limit the use of the proposed systems and methods.

The GUI illustrated in FIG. 1 could be implemented, for example, on a personal computer, a laptop computer, a netbook, a tablet, a smart phone, a wearable device such as a smart watch, or an Internet of Things (IoT) device, as further discussed below in connection with FIG. 6. The illustrated GUI includes a window 100 that is presented to a user (Keiki), for example as she opens her computer at the start of the day. This summary may also be available to Keiki on request at any time, or it may be automatically presented at certain times. For example, if Keiki has been in an online videoconference, window 100 may automatically be displayed after she hangs up the call, allowing her to quickly and easily decide what task to take up next. Other example events that might trigger display of this information include the beginning or end of a meeting or a designated block of "focus time" on Keiki's calendar, her saving and closing a word processing document that she has been editing, or her returning from an absence from her desk (for example, returning from lunch).

Window 100 has a title explaining that it is describing activities that may have happened while Keiki was gone (for example, work may have continued in other time zones while she was asleep). At the top is a block 102 of active conversations that occurred in channels that Keiki is interested in while she was away. In some implementations, these conversations may be "hotlinked" to the communications channels from which they came, so that Keiki may click on one of them to view the conversation in context. A direct message 104 from Krystal Mckinney is listed first because it was marked by the sender as "important" and so is displayed with an exclamation mark. This message was also sent only to Keiki, which makes it more likely that it includes an actionable task for her. In some implementations, the system may have knowledge of the organizational structure of Keiki's company, and may know, for example, that Krystal is senior to Keiki or is her supervisor and may increase the priority of messages from her accordingly.

The next message 106 on the list was sent to a channel that includes several people, as can be seen by the icon including multiple faces. Someone in the "July Promo Planning" channel has commented on "numbers and case studies" that were presumably shared with that channel. In addition, there is a notice 108 that someone used Keiki's name in the "Marketing→Northwind Traders" channel. As illustrated, the use of Keiki's name does not include a "@" symbol to indicate that it is directed to a specific person, but its priority was nevertheless elevated because of the use of her name. In some implementations, mentions that include the "@" symbol may receive higher priority than those that simply mention the name without the symbol, or only messages including the "@" symbol may be prioritized. Some implementations may include disambiguation systems for ensuring, for example, that Keiki Tanaka does not receive notices of messages directed to Keiki Morimoto, even if both of them are in the same workgroup. For example, MICROSOFT TEAMS® and SLACK® both provide a list of channel participants matching the letters typed following an "@" symbol and including a display photo if one is available, so that messages may be directed to the proper person. Even if a message simply mentions "@Keiki" without a last name, a disambiguation system may determine that the content of the question is closely related to Keiki Morimoto's work and only distantly to Keiki Tanaka's, and therefore not prioritize the question in Keiki Tanaka's customized list. This type of disambiguation is described, for example, in U.S. Pat. No. 7,685,201, incorporated by reference to the extent not inconsistent herewith, which discusses using available data such as location, organization, and relationship information to distinguish between persons having the same name.

In some implementations, the system may also be aware of nicknames, for example identifying a message directed to "Jaz" with user Jazmine Simmons. This functionality may be provided by a predetermined list of known nicknames, by allowing users to define nicknames as corresponding to specific names and/or specific individuals, and/or by allowing users to record their own nicknames in records for the use of others in the organization.

In some implementations, the method includes increasing the priority of messages that include unanswered questions for the task initiator (Keiki). In addition to prioritizing questions directed specifically to Keiki as discussed above, the system may determine whether questions have been directed to a group of users including Keiki (for example, everyone subscribed to the "Northwinds Traders" channel), and if so, whether she has answered them. Questions may be identified, for example, by searching for a question mark or for any of a predetermined list of "question words" (e.g., who, what, where, when, how, why). Contextual analysis methods may also be used to differentiate questions from other messages that use the "question words" but do not require reply. U.S. Patent Application No. 2015/0039704, which is incorporated herein by reference to the extent not inconsistent herewith, discussed prioritizing email messages based on identifying action items, meeting requests, and the like; these methods may be used for determining whether a question has been asked and whether it has been answered. In some implementations, meeting requests may be treated as a different class of event from "@ mentions," while in others, they may be mixed together. The system may also provide the ability for Keiki to mark a message identified as a question as "answered" and/or "no answer needed" in order to remove its priority adjustment from the system. In some implementations, this action may also be used to train a machine learning component, so that if Keiki always marks questions asked generally of users of a specific channel as "no answer needed," the system may stop prioritizing such messages.

The three illustrated messages 104, 106, 108 represent the most important events that occurred while Keiki was away from her computer, but she could click on "See more" below them to see other events. While the illustrated events are depicted in reverse chronological order, in general, ordering may not be chronological. Instead, the system may attempt to prioritize the list by its predicted importance to Keiki. The system may include a dialog box or other input means where she can identify specific users or channels that she considers it important to monitor closely. As discussed above, the system may also use a priori knowledge of the company's organizational chart to prioritize messages from certain workers, such as supervisors or members of Keiki's work group.

The next section 110 of the window shows Keiki's next meeting, at 10:00 AM. Keiki may notice that she needs to prepare for this meeting and decide to make that her first task of the day. The following section 112 shows recordings of other meetings that have occurred recently, which she may wish to view in order to get up to speed for other tasks. These may be meetings to which Keiki was invited, or the system may determine that other meetings to which she was not invited are nevertheless relevant enough to her work that she should see them in the summary window. For example, others may have met to discuss specific details of a project for which she is ultimately responsible, or they may have met to discuss a related area where she has provided important data or where priorities for her future work were discussed. The system determines which meetings to show in this section on the basis of connections with Keiki's work (for example, because the meeting participants opened or edited a file created by Keiki during the meeting, because the meeting name matches an area of her responsibilities, or because the meeting participants were all or mostly people who regularly work with Keiki). The priority of a meeting for possible display in this list may be made on the basis of machine-determinable feature(s) of the meeting. In particular, in implementations where machine-generated transcripts are available, they may be used to determine that topics related to Keiki's work were discussed at the meeting and the meeting may appear on her personalized list. As discussed above in connection with messages, the system may include a machine-learning component that notices which meetings Keiki chooses to view and updates its prioritization algorithm accordingly.

It is possible that the meetings section 112 will include meetings which Keiki attended (especially if recordings or transcripts of the meetings are newly available), but in some implementations, recordings of meetings that she missed will have higher priority for display. in some implementations, only items that Keiki is permitted to access will appear on her personalized list. Even if her supervisor has been in an extended meeting with others where problems with Keiki's work performance were discussed, recordings and transcripts of that meeting will not typically be provided to Keiki unless she has specifically been given access to them. However, in a specific example of a nonconfidential meeting, if several other members of her workgroup met without inviting her to discuss physical plant needs for a meeting where Keiki is coordinating presentations, she may want to skim the meeting to be sure that nothing happened in it that she needs to know, so such a meeting may appear in her "recorded meetings" list if the system determines that it is relevant to her work.

A final area 114 of this example window shows the file associated with Keiki that saw the most editing activity overnight. In some implementations, this section could also include more than one file. As discussed above in connection with the technical problem of avoiding user overwhelm in a work collaboration space, Keiki may have specified that she only wants to view the most active file to avoid being overwhelmed with too much information. Alternatively, there may only be one file that has seen heavy editing on this example day. In some implementations, files which have been edited in a way that suggests that Keiki needs to respond may have higher priority in this section. For example, if comments were inserted into a WORD® document that include questions (which may be identified by keywords, question marks, and/or @-mentions as discussed above in connection with identifying questions in text-based messages), the priority of that document to appear in window 100 may be increased. In some implementations, section 114 may also include an identifier such as "new questions" or "new comments from @Jazmin" along with the document so that Keiki knows that these elements have been added.

The different elements in window 100 all represent possible areas where Keiki may want to begin work in the morning. The illustrated compact summary provides the technical benefit of allowing her to quickly decide where to start, while the context-sensitive prioritization provides the technical benefit of reassurance that there is not another, more pressing task that is being overlooked. In some implementations, the window shown in FIG. 1 may be presented to Keiki's personal assistant (physical or virtual), rather than to Keiki herself.

FIG. 2 is a flow chart describing a back-end process for generation of a task list such as that shown in FIG. 1. The method illustrated in the flow chart of FIG. 2 is intended to be performed by a data processing system, and can be implemented locally, for example on the user's computer, or it may run as part of a remote system (for example, "in the cloud"). The system continuously monitors events in two or more channels 204 (step 202) that have been determined to be relevant to the task initiator (Keiki in FIG. 1). This determination may be made on the basis of user selection, user history, or other knowledge available to the data processing system, such as an organizational structure. As used herein, a "channel" is an avenue of communication between two or more users, such as email, a text messaging area, an audio conference, or a video conference. A work collaboration space may provide channels for specific purposes. For example, in an enterprise, the platform may provide channels for Marketing, Sales, Product Development, etc. These may also include subchannels, such as an area specifically devoted to discussing a single product rollout or a current or planned marketing campaign. Channels may include areas for asynchronous or synchronous text communication, and/or for virtual meetings that may be conducted by audio or by video by their participants. Channels may also be attached to certain files or other business objects, or to physical locations. For example, the channel for Building H would be the appropriate place to announce that there is leftover pizza available in the kitchen. Participants may be able to share files and work on them together as part of the infrastructure associated with a channel in a work collaboration space. It will be understood that not all channels include all of these infrastructure elements, and those of ordinary skill in the art will be able to implement the systems and methods described herein according to the features and capabilities of the provided work collaboration space.

For example, events on a monitored channel may include meetings (whether or not attended by Keiki), recordings of meetings being made available, messages sent to the channel(s), or editing of files. In a work collaboration space that includes infrastructure for video or audio meetings, when a meeting occurs on the channel, the channel sends a signal to interested parties that the meeting is happening. In implementations where a work collaboration space includes provisions for recording the meeting, the publication of that recording to the channel may be an additional separate event that is also signaled to channel members. This signal is received as an event by the system monitoring events shown in step 202 of the flow chart of FIG. 2.

As signals corresponding to events are generated in the channels (for example by others typing in messages or having meetings), the system identifies these events as being relevant to Keiki (step 206) and sorts them by projected priority for Keiki to create a prioritized list (step 208). As discussed above in connection with FIG. 1, Keiki may be interested in all events occurring on a channel, or may only be interested in certain topics on the channel. If Keiki is only interested in some of the events occurring on the channel, the data processing system running the method of FIG. 2 may apply previously specified preferences to decide whether a particular event is identified as relevant in step 206 (for example, Keiki may have specified that she is interested in meetings that have names including "marketing" or in messages that include the word "market"). Another user's sending a message to a channel including Keiki is another type of event. If the message is directed to Keiki (for example using an @-identifier), it may be determined to be relevant to her and will have a priority determined. If a message includes a question (identified as discussed above), it may be assumed that it is directed to everyone in the channel and therefore will be relevant to Keiki, unless it also includes an @-identifier to someone else or the system is able to use other context clues to determine that it is not relevant. Thus, a message stating, "Does anyone have the August marketing data?" or "@Keiki, do you have the August marketing data?" will generally be relevant, but a message stating "@Babak, do you have the August marketing data?" may not be determined to be relevant, unless Keiki has specified that she is interested in all messages about "marketing data," whoever may be mentioned in them. Alternatively, in implementations that include a machine learning feature, the data processing system may monitor which events presented on the list Keiki actually clicks on, and may use this data to improve its ability to identify relevant events and to prioritize them appropriately for her. Inputs for such an implementation may also include explicit ranking by Keiki of specific events as "important" or "relevant."

Once the data processing system has collected the relevant events, it sorts them by expected priority for Keiki (step 208). As discussed above, this step may involve applying a weighting to a given event depending on who and what it involved. In implementations where the data processing system has knowledge of the organizational structure, events involving Keiki's supervisors and other senior employees may have increased priority. Events related to user-identified topics of interest may also be given priority, as may meetings to which Keiki was invited and/or recordings of meetings that she did not attend. The implementation details of this step may be context-dependent, but those of ordinary skill in the art will be familiar with how to structure a priority ranking system for presentation of events. For example, U.S. Pat. Nos. 7,885,948 and 10,257,149 and U.S. Patent Publication No. 2019/0140993, which are incorporated herein by reference to the extent not inconsistent herewith, describe priority ranking communications on the basis of subject, source, sender, and content.

In parallel with monitoring for events (step 202), the system depicted in FIG. 2 monitors for Keiki to be ready to initiate a new task (step 210). Signals that she is ready to begin a new task may include starting up her computer after a period of inactivity, manually opening the window 100 shown in FIG. 1, concluding a meeting, beginning a scheduled "focused" work time, ending a scheduled "focused" work time, or closing a file. Each of these items represents a signal that she is concluding a previous focus of activity, and thus is ready to start a new topic. Upon receiving any of these signals, the data processing system provides the prioritized list to Keiki (step 212). It will be understood that the list provided may not be sorted only by priority, but may also be grouped in other ways. For example, in FIG. 1, the suggested tasks were grouped into types (e.g., conversations, upcoming meetings, active files) and sorted by priority within each type. In other implementations, tasks may be differently sorted. Sorting may be predetermined or user determinable. The monitoring of channels relevant to the user, prioritization of events, and presentation of the event list to the user at the time that she begins a new task represent a technical effect that produce a technical benefit of timely presentation of important information at the time that the user is most prepared to use it.

Figure 3:
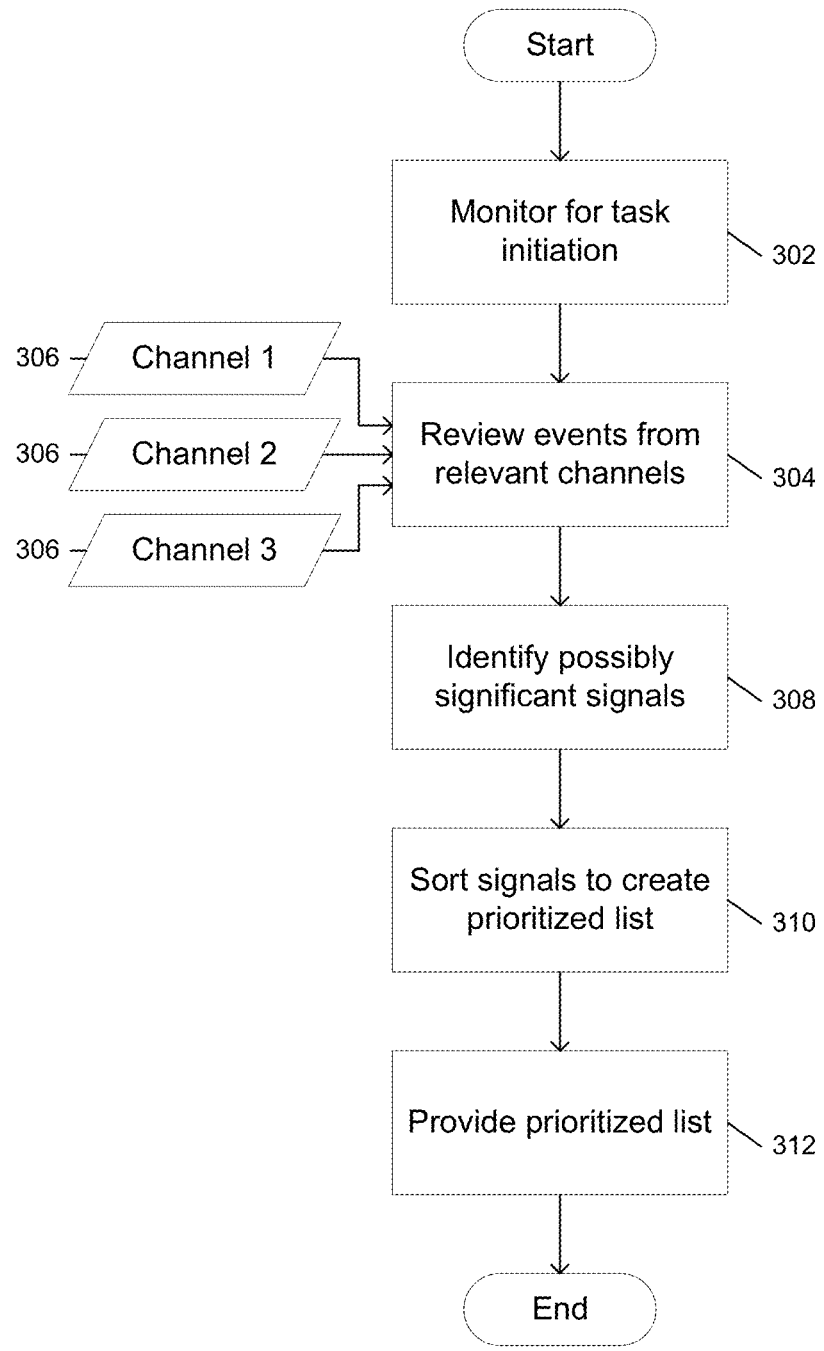
FIG. 3 is a flow chart describing an alternate process for generating user notifications.

FIG. 3 is another flow chart illustrating a different back-end method for generating the task list, which is also performed by a data processing system, and can be implemented locally or as part of a remote system (for example, "in the cloud"). According to this method, the data processing system waits to receive a task initiation signal that the user is about to shift to a new task (step 302). Task initiation signals may include such actions as returning to work at his or her computer after a period of inactivity, manually opening the window 100 shown in FIG. 1, concluding a meeting, beginning a scheduled "focused" work time, ending a scheduled "focused" work time, or closing a file. The system reviews logs of the relevant channels 306 (step 304) to identify possibly relevant events (step 308). In some implementations, the data processing system continuously monitors the channels that the user is interested in and creates its own log of all events that occur in the channel. These implementations are particularly advantageous when the data processing system is already part of the channel infrastructure, especially if there is one system that monitors channels for multiple users. In this situation, the data processing system can maintain one log for each channel and consult it for different users at the appropriate times. In other implementations, the channels are responsible for maintaining their own logs, and the system consults them when it receives the task initiation signal (step 302). These implementations may be more suitable for a locally-run back end, although they may also be used for cloud-based systems.

Once the data processing system has consulted the channel logs (local or remote), it determines which events are potentially relevant (step 308). As was described in connection with FIG. 2, this determination may be on the basis of user-specified preferences, which may be modified by @-references and/or by detected questions. The system then sorts the identified signals (step 310) and provides the list (step 312) as discussed above. The monitoring of channels relevant to the user, prioritization of events, and presentation of the event list to the user at the time that she begins a new task represent a technical effect that produce a technical benefit of timely presentation of important information at the time that the user is most prepared to use it. This process may generate the same results as the one shown in FIG. 2, but uses different resources at different times. Those of ordinary skill in the art will recognize that the illustrated methods are not the only possible methods of obtaining the data to present to the task initiator, and will be able to select the most appropriate method in view of data hosting/control, channel capabilities, memory constraints, time constraints, uptime characteristics, and any other characteristics or constraints presented by a particular system.

FIG. 4 shows a different example GUI from that presented in FIG. 1. This interface is organized around files and/or meetings that are being edited and/or discussed. The GUI of FIG. 4 includes a main window 400 personalized for Keiki Tanaka, labeled as "Today's catch up." First section 402 includes a bar 404 for events related to a meeting entitled "July promotions." This may be an upcoming meeting or a meeting that has already occurred. As discussed above, Keiki may have been invited to this meeting, or the data processing system may have decided that it was relevant to her (and important enough to display first) even though she was not invited to it directly. Such a determination may be made, for example, because the people who have been invited to the meeting also work closely with Keiki, or because it is related to an area of technical expertise for her.

The July promotions meeting bar 404 has at least one file bar 406 associated with it, entitled JulyPromotion.docx. As shown, an icon 408 indicates that someone is currently editing this file (the icon may be a generic "person" icon, or it may be a photo or other representation of the actual person editing the file). Keiki may want to interact with this person now or soon while they are already focusing on working with the file. In one implementation, she can message the person directly by clicking on their icon. Other ways to interact with the file may be accessed by clicking on the three dots 410 at the end of the display bar, which may lead to other functions like opening the file, previewing it, or downloading a local copy. The words "See more" below the display bar may allow her to look at other files that have been associated with the same meeting.

The next bar 412 represents a task that is associated with the meeting. As illustrated, Keiki can recognize it as a task by its TRELLO® icon, but of course other icons could be used or it could be associated with a different piece of software that allows assignment of tasks. In some implementations, it may be a task specifically assigned to Keiki, or in others, it may be a task that has been assigned to someone else or that needs to be done but has not yet been assigned to anyone. As with the JulyPromotion.docx file, the three dots on this bar allow some kind of interaction with the task, such as opening it, previewing it, or downloading a local copy of it.

The last bar 414 in section 402 represents a discussion related to the July promotions meeting that is occurring in the Northwind Traders→Marketing channel. This discussion includes Krystal Mckinney and two other people in the channel. A small excerpt of the discussion is shown, as well as the time of the last message (2 hours ago), so that Keiki can decide if she wants to join the discussion now. In the pictured implementation, this bar does not include the three dots that lead to more possible ways to interact, so that Keiki can only click on the bar to join the discussion. In other implementations, more actions may be available in relation to this discussion. The discussion may have been determined to be related to the meeting even though they are not occurring in the same channel, for example because someone in the discussion has named and/or linked to the meeting invitation. Below these links is a section 416 showing icons and/or photos identifying people who have mentioned the "July promotions" meeting in asynchronous text discussions.

The next section 418 of the window 400 is linked to a presentation file, Market Watch 19.pptx. Similarly to section 402, it also has a single person who has commented on it in some discussion channel (Babak Shamash), as well as August projections and a task waiting for assignment. Fewer people are discussing this file, which has been determined to be of lower priority to Keiki than the July promotions meeting. This expanded view of activity surrounding the meeting and the presentation file also provide a technical benefit to Keiki of being able to view their connections, and of presenting these connections to her as the system detects that she is ready for her next task.

The proposed systems and methods are aimed to provide comprehensive but human-accessible lists of events that may inform a user's choice of a task. In some implementations, the data processing system executing the method can also be associated with machine learning algorithms (MLAs) to improve user experiences by improving the quality of determination of relevance and importance of events. In different implementations, a training system may be used that includes an initial ML model (which may be referred to as an "ML model training module") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to identify and/or classify device events or user behavior based on data collected during use of the system. In some implementations, machine learning techniques may generate one or more models for identifying and/or characterizing events based on a corpus of training data in the form of labeled or otherwise previously characterized data. In some implementations, one or more portions of the training data may be provided via the device(s) itself. Furthermore, the training data may be continually updated and one or more of the models used by the classification system can be revised or regenerated to reflect the updates to the training data. Over time, the training system (whether stored remotely, locally, or both) can be configured to receive and accumulate more and more device-generated training data items from locally operated assistive devices and/or other training data collection devices, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties to the extent not inconsistent herewith.

Figure 5:
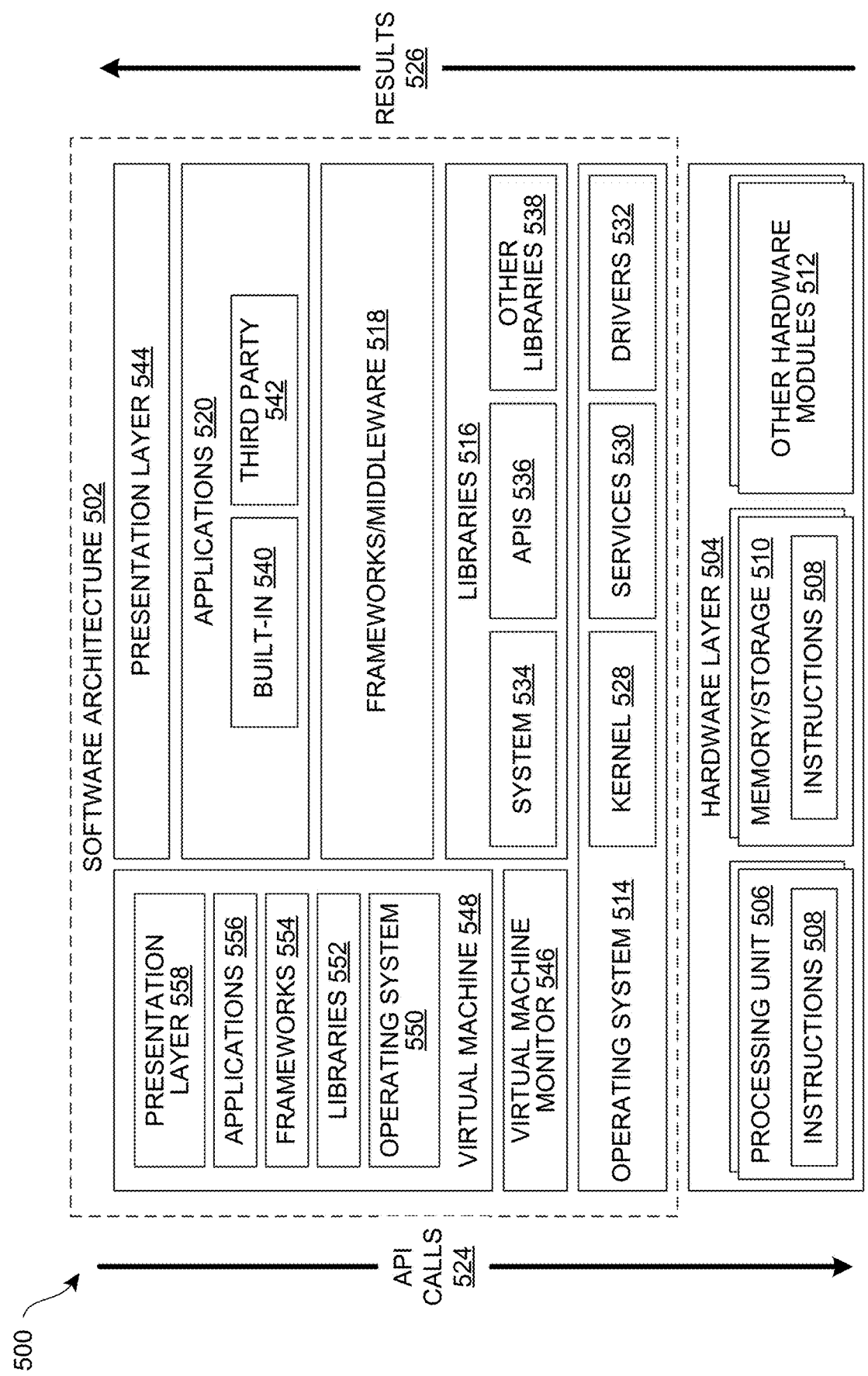
FIG. 5 is a block diagram of an example computing device, which may be used to provide implementations of the systems and methods described herein.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as the data processing system running the methods of FIG. 2 or FIG. 3 that may include, among other things, document storage, processors, memory, and input/output (I/O) components. A representative hardware layer 504 is illustrated and can represent, for example, the devices described herein. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine. The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
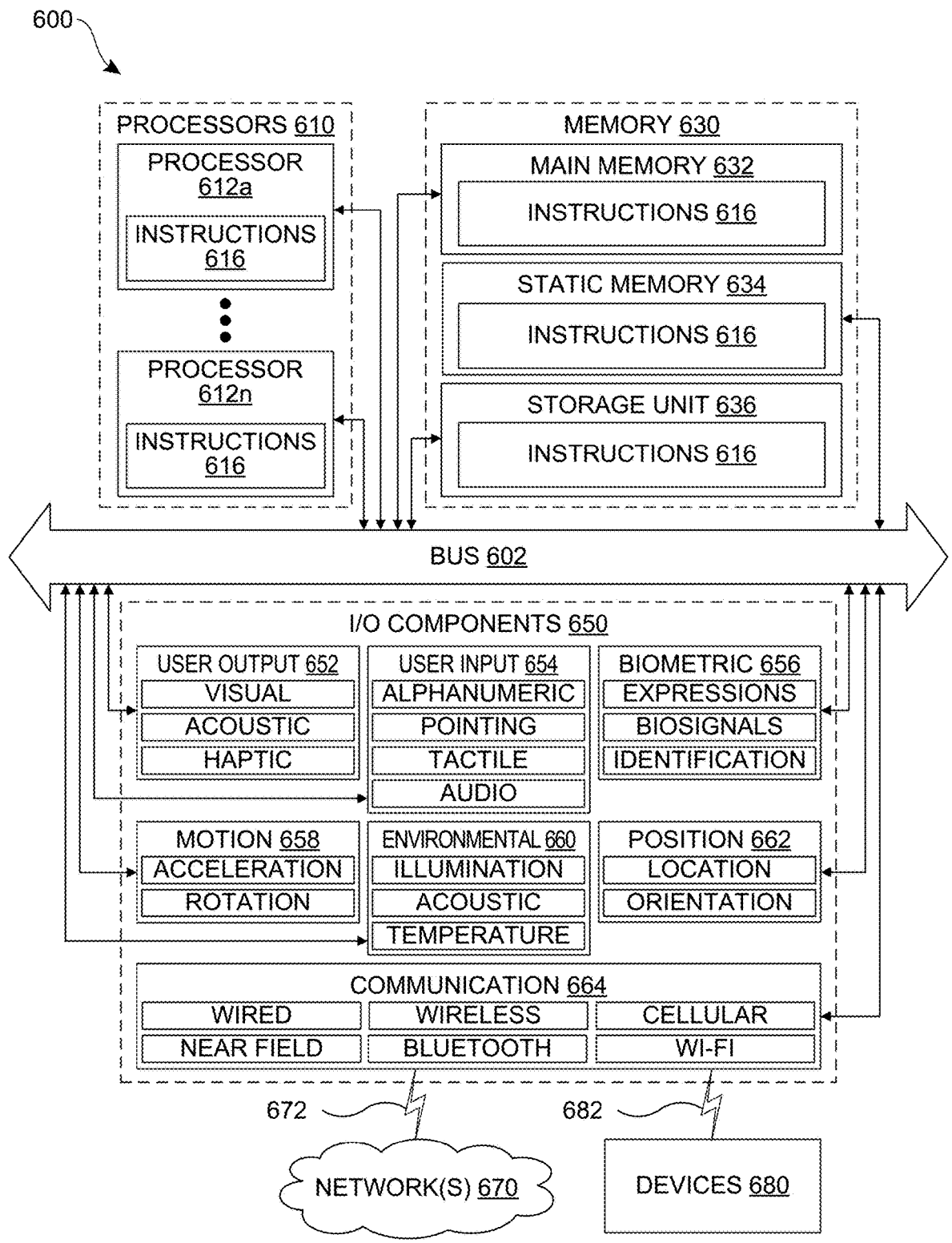
FIG. 6 is a block diagram illustrating components of an example machine configured to read instructions from a machine-readable medium.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

Figure 7:
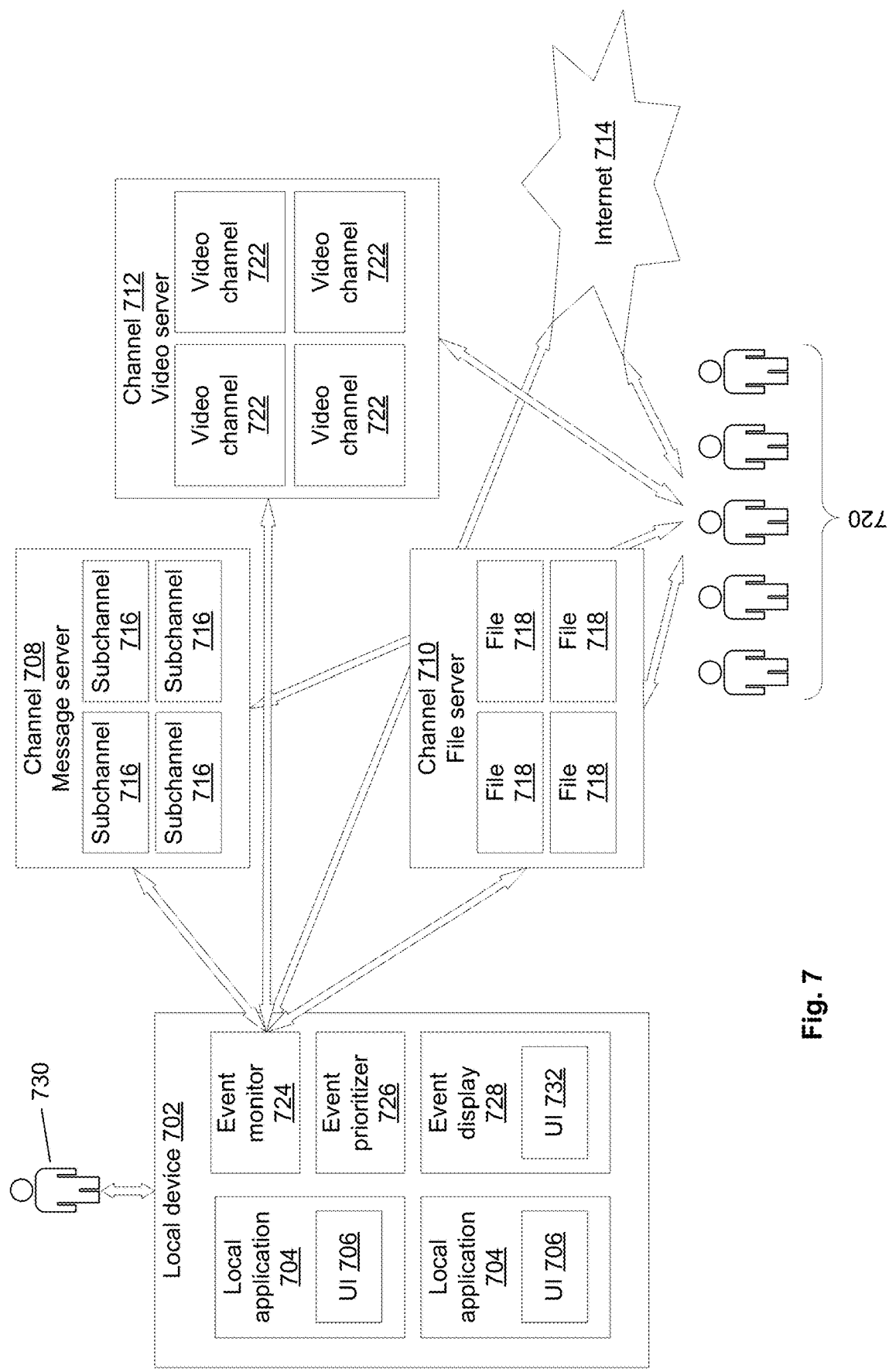
FIG. 7 is a block diagram illustrating components of a network, which may be used to provide implementations of the systems and methods described herein.

FIG. 7 is a block diagram illustrating an implementation of a network including a system for providing a prioritized task list to a user. As illustrated, the network 700 includes a local device 702, which is running one or more local application(s) 704. Each local application shown includes a user interface 706. As illustrated, local application(s) 704 reside on local device 702, in other implementations, these application(s) may be hosted in a server and accessible to the user via a network. The local device interfaces with a plurality of channels 708, 710, 712, and further with the internet 714.

Channel 708 is a message server (which may in some implementations provide a number of subchannels 716), which stores messages sent by users and directs them to other users in the channel. Examples of this type of server include SLACK® and MICROSOFT TEAMS® (although both of these programs also include other types of functionality, as well). In some implementations, the message server 708 maintains different subchannels 716 that include different sets of users. When a user sends a message to a subchannel 716, that message is sent (as an event) to all other users in that subchannel 716.

Channel 710 is a file server, which serves as a repository for files 718 available to be jointly edited by users 720, 730. Users may edit files while they remain on file server 710, or they may download them locally (for example using local application 704), edit them, and re-upload them. Users may also upload new files to the file server. In some implementations, channels 708 and 710 may also be in communication with one another, for example when users having discussions on channel 708 are discussing and linking to files stored on channel 710.

Channel 712 is a videoconferencing server including several video channels 722. As illustrated, it is also in communication with channel 708 (the message server) and channel 710 (the file server), so that users of the video channels 722 may also send one another text messages (which may be asynchronous) or share files 718 during video conferences. It will be understood that the network may include other types of channels, and that these may be configured for synchronous communication, asynchronous communication, or both. The illustrated network 700 also includes the internet 714. In different implementations, any of the illustrated channels 708, 710, 712 (or other channels that may be included in other implementations) may be part of the internet 714, or may be part of a private network but in communication with the internet 714 (as illustrated in FIG. 7), or may be completely unconnected to the internet 714.

In use, as discussed above in connection with FIG. 1-FIG. 4, local device 706 includes an event monitor 724 that monitors events from channels 708, 710, and 712, and in some implementations, from internet 714. These events may include, for example, text or image-based messages sent over message server 708, files uploaded, downloaded, or edited on file server 710, or video or audio calls mediated through video server 712. Events collected by event monitor 724 are prioritized by event prioritizer 726 and displayed for user 730 using a user interface 732, as described above in FIG. 2 and FIG. 3. While FIG. 7 does not explicitly show event monitor 724 receiving events from the internet, it is also possible that it will monitor events there. For example, rather than being in a local network, a video server may be hosted on the internet, and event monitor 724 may be aware of it and monitor events occurring there.

In the following, further features, characteristics and advantages of the invention will be described by means of items:

Item 1: A data processing system, including a processor and machine-readable media including instructions. When executed by the processor, the instructions cause the processor to a) monitor events in a plurality of communications channels associated with a user, each communications channel representing an avenue of communication between the user and one or more communication partners, b) identify monitored events that are determined to be pertinent to the user, c) sort the identified events by priority to create a prioritized list of events, d) monitor interactions with the data processing system by the user for a task initiation signal, where the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user, and e) in response to detecting the task initiation signal, cause display of the prioritized list of events to the user on a display device.

Item 2: The data processing system of Item 1, where the events include at least one event selected from the group consisting of meetings that the user attends, meetings attended by persons known to be associated with the user, discussions that include questions that have been asked of the user, discussions that include questions that have been asked of a group of recipients that includes the user, editing of files that have been opened by the user, and editing of files that have been created by the user.

Item 3: The data processing system of any of the preceding Items, where the data processing system is configured to identify questions by searching for a question mark or for a word or phrase from a predetermined list of question words or phrases.

Item 4: The data processing system of any of the preceding Items, where the events include discussions that include questions that have been asked of the user or of a group of recipients that includes the user, and where providing the prioritized list of events includes determining which of the questions have been answered by the user, and presenting questions that have not been answered by the user with higher priority than questions that have been answered by the user Item 5: The data processing system of any of the preceding Items, where creating the prioritized list of events includes sorting the list according to a set of priority rules that includes at least one rule selected from the group consisting of increasing priority for discussions that include questions that have been asked by a person having a position of authority, increasing priority for discussions of files that were created by the user; and increasing priority for discussions relating to an area of expertise of the user.

Item 6: The data processing system of any of the preceding Items, where the communications channels include at least one channel selected from the group consisting of email, text messages, audio conferencing, and video conferencing.

Item 7: A method performed by a data processing system for selectively displaying events pertinent to a user, the method comprising monitoring a plurality of communications channels associated with the user, each communications channel representing an avenue of communication between the user and one or more communication partners, identifying events that are determined to be pertinent to the user, sorting the identified events by priority to create a prioritized list of events, monitoring interactions with the data processing system by the user for a task initiation signal, where the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user, and, in response to detecting the task initiation signal, cause display of the prioritized list of events to the user on a display device.

Item 8: The method of Item 7, where the events include questions that have been asked of the user that the user has not yet answered.

Item 9: The method of Item 7 or 8, further comprising searching the identified events for question indicators selected from the group consisting of a question mark and a list of stored question words.

Item 10: The method of any of Items 7-9, where the events include at least one event selected from the group consisting of meetings that the user attends, meetings attended by persons known to be associated with the user, discussions that include questions that have been asked of the user, discussions that include questions that have been asked of a group of recipients that includes the user, editing of files that have been opened by the user, and editing of files that have been created by the user.

Item 11: The method of any of Items 7-10, where the events include discussions that include questions that have been asked of the user or of a group of recipients that includes the user, and where providing the prioritized list of events includes, determining which of the questions have been answered by the user and presenting questions that have not been answered by the user with higher priority than questions that have been answered by the user.

Item 12: The method of any of Items 7-11, where creating the prioritized list of events includes sorting the list according to a set of priority rules that includes at least one rule selected from the group consisting of increasing priority for discussions that include questions that have been asked by a person having a position of authority, increasing priority for discussions of files that were created by the user, and increasing priority for discussions relating to an area of expertise of the user.

Item 13: The method of any of Items 7-12, where identifying events that are determined to be pertinent to the user includes consulting a preference previously specified by the user, where the preference is that a subject matter area, a keyword, a person, or a file is pertinent to the user.

Item 14: The method of any of Items 7-13, where identifying events that are determined to be pertinent to the user includes consulting a history of files opened by the user, a history of meetings attended by the user, or a list of persons known to work with the user.

Item 15: The method of any of Items 7-14, where the communications channels include at least one channel selected from the group consisting of email, text messages, audio conferencing, and video conferencing.

Item 16: A data processing system including a plurality of communications channels, each communications channel representing an avenue of communication between a user and one or more communication partners, a memory configured to collect and to store events from the communications channels, a prioritizer configured to receive a record of events from the memory and further configured to create a prioritized list of events that are expected to be most relevant to the user, a task monitor configured to determine that the user is ready to begin a new task, where the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user, and a user interface configured to present the prioritized list of events in response to a determination by the task monitor that the user is ready to begin the new task.

Item 17: The data processing system of Item 16, where the events include questions that have been asked of the user that the user has not yet answered.

Item 18: The data processing system of Item 16 or 17, where the events include at least one event selected from the group consisting of meetings that the user attends, meetings attended by persons known to be associated with the user, discussions that include questions that have been asked of the user, discussions that include questions that have been asked of a group of recipients that includes the user, editing of files that have been opened by the user, and editing of files that have been created by the user.

Item 19: The data processing system of any of Items 16-18, where the events include discussions that include questions that have been asked of the user or of a group of recipients that includes the user, and where the prioritizer is configured to determine which of the questions have been answered by the user, and prioritize questions that have not been answered by the user with higher priority than questions that have been answered by the user.

Item 20: The data processing system of any of Items 16-19, where the communications channels include at least one channel selected from the group consisting of email, text messages, audio conferencing, and video conferencing.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing system, comprising:
   a processor; and
   machine-readable media including instructions which, when executed by the processor, cause the processor to:
      monitor events in a plurality of communications channels associated with a user, each communications channel representing an avenue of communication between the user and one or more communication partners;
      identify monitored events that are determined to be pertinent to the user;

sort the identified events by priority to create a prioritized list of events;

monitor user interactions with the data processing system for a task initiation signal, wherein the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user; and in response to detecting the task initiation signal, cause display of the prioritized list of events to the user on a display device.

2. The data processing system of claim 1, wherein the events include at least one event selected from the group consisting of:

meetings that the user attends;

meetings attended by persons known to be associated with the user;

discussions that include questions that have been asked of the user;

discussions that include questions that have been asked of a group of recipients that includes the user;

editing of files that have been opened by the user; and editing of files that have been created by the user.

3. The data processing system of claim 2, wherein the data processing system is configured to identify questions by searching for a question mark or for a word or phrase from a predetermined list of question words or phrases.

4. The data processing system of claim 2, wherein the events include discussions that include questions that have been asked of the user or of a group of recipients that includes the user, and wherein providing the prioritized list of events includes:

determining which of the questions have been answered by the user; and presenting questions that have not been answered by the user with higher priority than questions that have been answered by the user.

5. The data processing system of claim 1, wherein creating the prioritized list of events includes sorting the list according to a set of priority rules that includes at least one rule selected from the group consisting of:

increasing priority for discussions that include questions that have been asked by a person having a position of authority;

increasing priority for discussions of files that were created by the user; and increasing priority for discussions relating to an area of expertise of the user.

6. The data processing system of claim 1, wherein the communications channels include at least one channel selected from the group consisting of email, text messages, audio conferencing, and video conferencing.

7. A method performed by a data processing system for selectively displaying events pertinent to a user, the method comprising:

monitoring a plurality of communications channels associated with the user, each communications channel representing an avenue of communication between the user and one or more communication partners;

identifying events that are determined to be pertinent to the user;

sorting the identified events by priority to create a prioritized list of events;

monitoring user interactions with the data processing system for a task initiation signal, wherein the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user; and in response to detecting the task initiation signal, cause display of the prioritized list of events to the user on a display device.

8. The method of claim 7, wherein the events include questions that have been asked of the user that the user has not yet answered.

9. The method of claim 7, further comprising searching the identified events for question indicators selected from the group consisting of a question mark and a list of stored question words.

10. The method of claim 7, wherein the events include at least one event selected from the group consisting of:

meetings that the user attends;

meetings attended by persons known to be associated with the user;

discussions that include questions that have been asked of the user;

discussions that include questions that have been asked of a group of recipients that includes the user;

editing of files that have been opened by the user; and editing of files that have been created by the user.

11. The method of claim 10, wherein the events include discussions that include questions that have been asked of the user or of a group of recipients that includes the user, and wherein providing the prioritized list of events includes:

determining which of the questions have been answered by the user; and presenting questions that have not been answered by the user with higher priority than questions that have been answered by the user.

12. The method of claim 7, wherein creating the prioritized list of events includes sorting the list according to a set of priority rules that includes at least one rule selected from the group consisting of:

increasing priority for discussions that include questions that have been asked by a person having a position of authority;

increasing priority for discussions of files that were created by the user; and increasing priority for discussions relating to an area of expertise of the user.

13. The method of claim 7, wherein identifying events that are determined to be pertinent to the user includes consulting a preference previously specified by the user, where the preference is that a subject matter area, a keyword, a person, or a file is pertinent to the user.

14. The method of claim 7, wherein identifying events that are determined to be pertinent to the user includes consulting a history of files opened by the user, a history of meetings attended by the user, or a list of persons known to work with the user.

15. The method of claim 7, wherein the communications channels include at least one channel selected from the group consisting of email, text messages, audio conferencing, and video conferencing.

16. A data processing system comprising:
a plurality of communications channels, each communications channel representing an avenue of communication between a user and one or more communication partners;
a memory configured to collect and to store events from the communications channels;
a prioritizer configured to receive a record of events from the memory and further configured to create a prioritized list of events that are expected to be most relevant to the user;
a task monitor configured to determine that the user is ready to begin a new task by identifying a task initiation signal, wherein the task initiation signal is one of i) a request by the user, ii) the user beginning to use a computer after an absence, iii) a conclusion of a meeting including the user, iv) a beginning of a designated focused work time specified by the user, v), an end of a designated focused work time specified by the user, or vi) a closing of a file by the user; and
a user interface configured to present the prioritized list of events in response to a determination by the task monitor that the user is ready to begin the new task.

17. The data processing system of claim 16, wherein the events include questions that have been asked of the user that the user has not yet answered.

18. The data processing system of claim 16, wherein the events include at least one event selected from the group consisting of:
meetings that the user attends;
meetings attended by persons known to be associated with the user;
discussions that include questions that have been asked of the user;
discussions that include questions that have been asked of a group of recipients that includes the user;
editing of files that have been opened by the user; and
editing of files that have been created by the user.

19. The data processing system of claim 16, wherein the events include discussions that include questions that have been asked of the user or of a group of recipients that includes the user, and wherein the prioritizer is configured to:
determine which of the questions have been answered by the user; and
prioritize questions that have not been answered by the user with higher priority than questions that have been answered by the user.

20. The data processing system of claim 16, wherein the communications channels include at least one channel selected from the group consisting of email, text messages, audio conferencing, and video conferencing.

* * * * *